Sept. 14, 1943.    J. R. HICKS ET AL    2,329,370
RATE-EXHIBITING DEVICE FOR INTEGRATING METERS
Filed April 1, 1940    3 Sheets-Sheet 1
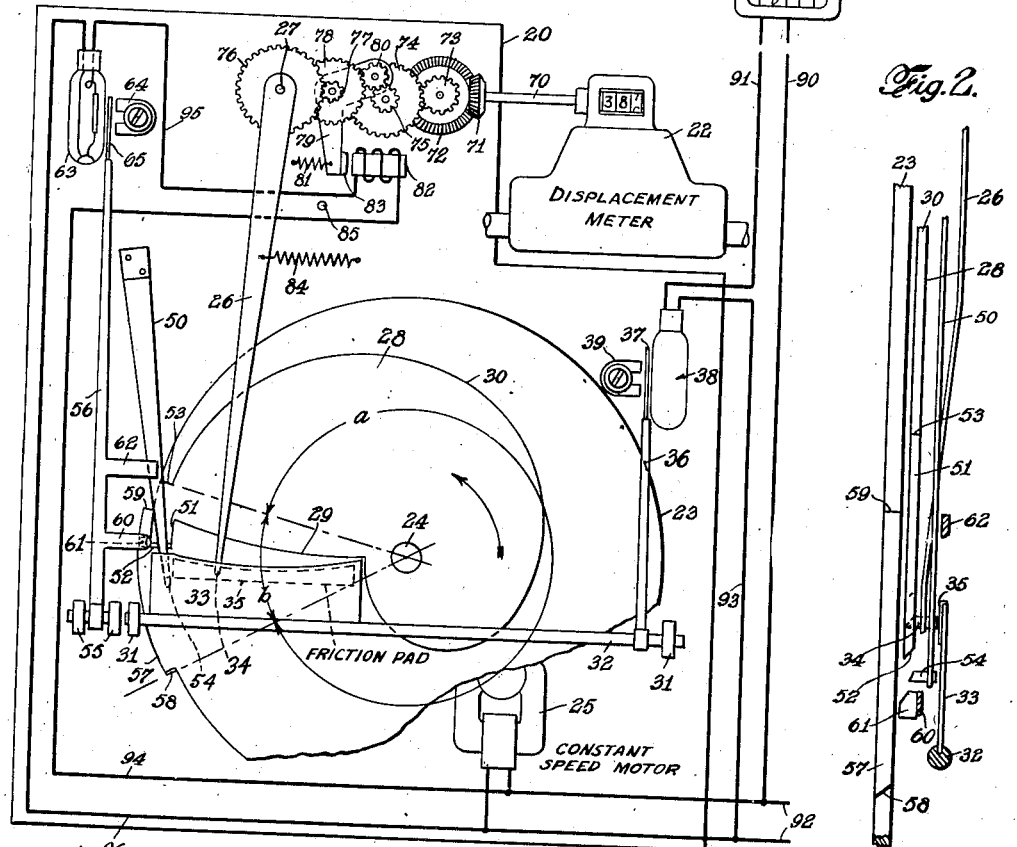
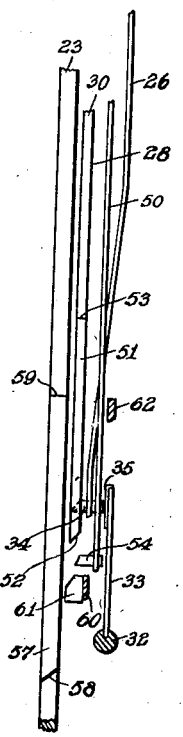
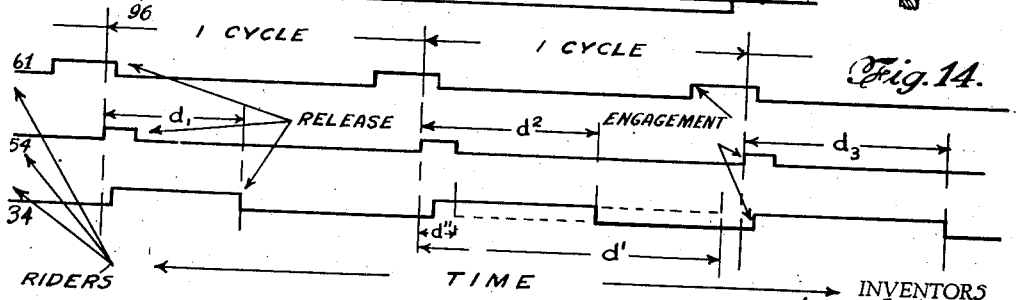
INVENTORS
JAMES R. HICKS AND
PERRY A. BORDEN
BY
ATTORNEY Sept. 14, 1943. J. R. HICKS ET AL 2,329,370
RATE-EXHIBITING DEVICE FOR INTEGRATING METERS
Filed April 1, 1940 3 Sheets-Sheet 2
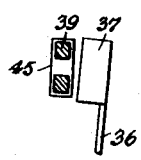
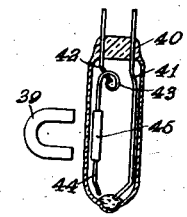
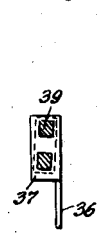
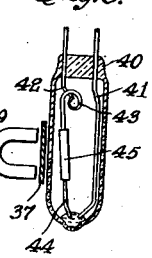
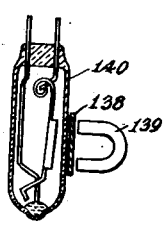
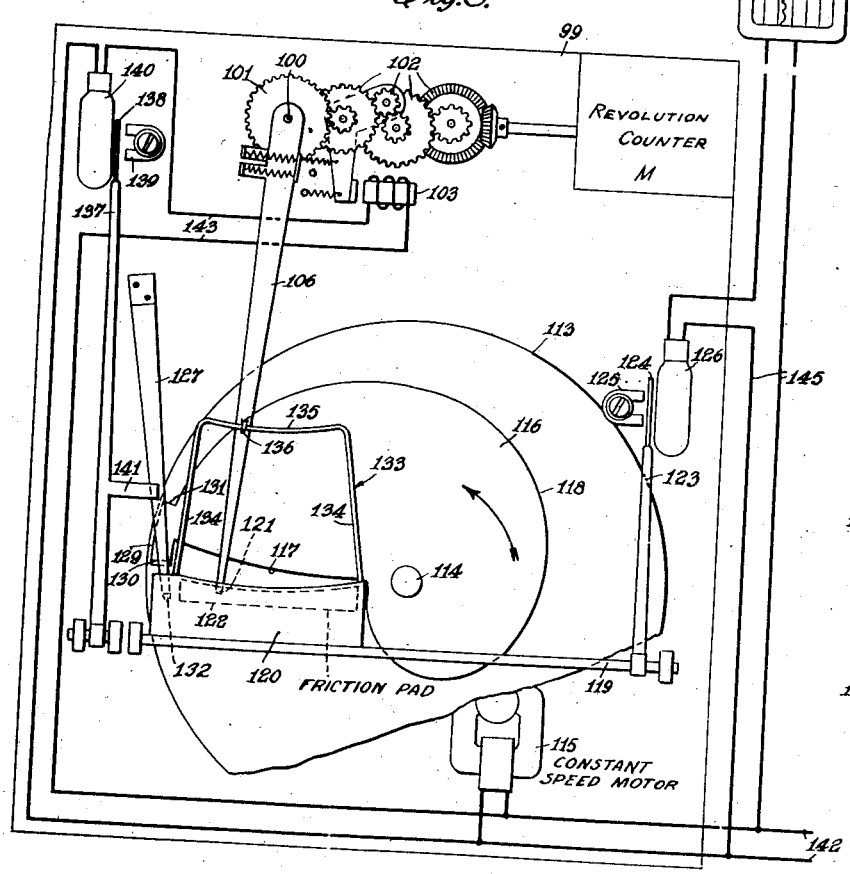
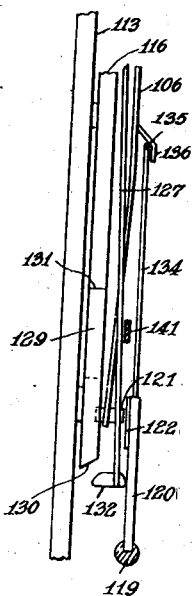
INVENTORS
JAMES R. HICKS AND
PERRY A. BORDEN
BY
ATTORNEY.

Sept. 14, 1943.   J. R. HICKS ET AL   2,329,370
RATE-EXHIBITING DEVICE FOR INTEGRATING METERS
Filed April 1, 1940   3 Sheets-Sheet 3
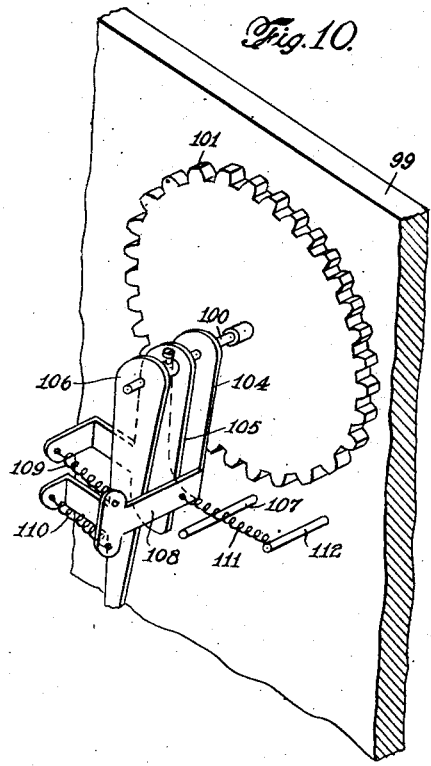
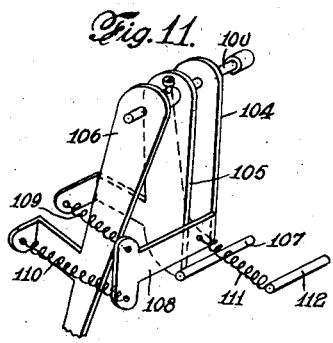
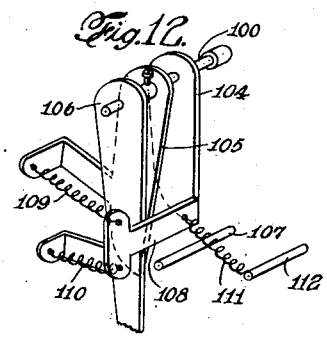
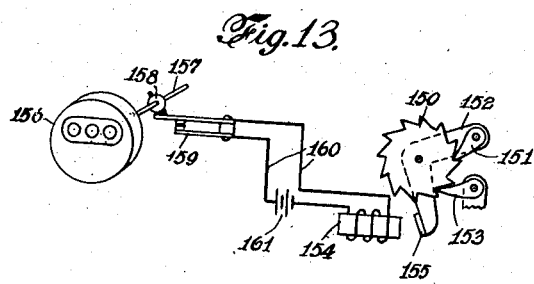
INVENTORS
JAMES R. HICKS AND
PERRY A. BORDEN
BY
ATTORNEY.

Patented Sept. 14, 1943

2,329,370

UNITED STATES PATENT OFFICE 2,329,370

RATE-EXHIBITING DEVICE FOR INTEGRATING METERS

James R. Hicks and Perry A. Borden, Waterbury, Conn., assignors to The Bristol Company, Waterbury, Conn., a corporation of Connecticut Application April 1, 1940, Serial No. 327,258

6 Claims. (Cl. 177—351)

This invention relates to a rate-exhibiting device for integrating meters, and more especially to a device whereby there may be obtained an indication or graphic record of successive angular velocities or rates of flow as measured by a revolution counter or a meter of the continuously advancing class, such as a flow meter of the displacement type, an electric watthour meter, or a rotating anemometer, etc.

In the measurement of the total volume of a flowing fluid over a predetermined time, or in the measurement of the total amount of energy consumed in an electrical circuit, the continuously advancing or integrating meter is recognized as possessing a degree of precision and permanence difficult to approach in instruments of the deflecting types; and the motor action of such meters usually renders available an amount of power sufficient for furnishing satisfactory registrations of the measured magnitudes. Furthermore, in some applications, such as where viscous fluids are involved, the displacement meter provides the only means by which flow can be satisfactorily determined. Where an integration on a basis of elapsed time is the only form in which the measurement is desired to be performed, there is required no exhibiting device other than a register in the form of a counting train driven from the moving element of the meter and having its dials calibrated in suitable units of flow.

In the measurement of angular velocities, however, and in many instances where a meter of the displacement class is utilized, it is desired to obtain, in addition to, or instead of, an integration, an indication or record which will provide a measure representing the instantaneous velocities, or rates of flow of the quantity passing through the meter. In other words, it becomes desirable to perform by mechanical means a mathematical process equivalent to an approximate differentiation of a rate/time graph and obtain a scalar magnitude representing at each increment of time the average rate during that interval.

It is a recognized fact that a function not dissimilar to that desired is performed by many types of so-called "demand meters," especially in the electrical industry, wherein a movable member is periodically engaged with an integrating train and advanced thereby for a limited time, after which a measure of the position of said member is made and the member reset to its zero of reference for a succeeding cycle. While, according to mathematical theory, and under conditions which it is possible to obtain on carefully "staged" tests, the practice of transmitting the increments of advance of an integrating meter to an associated indicating or remote reading device on an intermittent, rather than a continuous, basis, or the practice of "sampling," or taking preselected time increments as representative of the whole operating period, is subject to considerable error, practice has shown that over periods of time, which do not require to be extended beyond three or four cycles of operation, the probable error reduces to a negligible magnitude, leaving the method of measurement quite acceptable for a large proportion of industrial practice.

It is an object of this invention to provide means whereby measurements may be periodically made of the mean velocity of a rotating part over a definite interval of time, and these measurements translated into a form suited to the actuation of a continuously indicating or recording instrument.

It is a further object to provide means whereby an indicating or recording instrument may be located at a considerable distance from the translating means, being associated therewith only through the medium of a simple two-conductor electrical circuit.

A still further object is to provide means whereby the two functions of averaging the meter speed over selected increments of time and of translating the average into an exhibited measurement may be performed more or less simultaneously, so that the elements performing each function may be active during a relatively great proportion of elapsed time.

To this end, it is proposed to provide a translating device combining in a single mechanism the basic principles of the so-called "block-interval" type of demand meter with those of the "impulse" system of telemetering in a manner to provide a substantially continuous indication or record of the mean rates of operation of a displacement or integrating type of meter over predetermined intervals, and thus to obtain a measure of the velocity, flow, or other magnitude to which the meter is applied.

The nature of the invention, however, will best be understood when described in connection with the accompanying drawings, in which:

Fig. 1 is a more or less diagrammatic view and front elevation of a complete installation embodying the principles of the invention as applied to a direct-connected meter unit.

Fig. 2 is a side elevation, to a larger scale, of certain elements of the mechanism shown in Fig. 1.

Figs. 3, 4, 5, and 6 are different elevations and part vertical sections of a circuit-controlling device which may advantageously be used as a part of the mechanism.

Fig. 7 is a part vertical section and side elevation of a circuit-controlling device similar to the device indicated in Figs. 3 to 6, but having a different contact arrangement.

Fig. 8 is a more or less diagrammatic view and front elevation of an instrument embodying the principles of the invention in an alternative form.

Fig. 9 is a side elevation, to a larger scale, of certain elements of the mechanism shown in Fig. 8.

Figs. 10, 11, and 12 are perspective views of certain other elements of mechanism embodied in the novel installation and shown in relative positions corresponding to different operating conditions.

Fig. 13 is a diagrammatic view showing an alternative arrangement whereby an instrument embodying the invention may be operated from a remotely located meter unit.

Fig. 14 is a graphical representation of the timing of certain of the cyclical functions of apparatus embodying the principles of the invention.

Referring to Figs. 1 and 2 of the drawings, the translating device includes a base-plate 20 having mounted thereon the principal elements of a mechanism for the purpose of producing in a scalar form, on a suitable indicating or recording instrument 21, measurements representative of rates of fluid flow as determined by a meter 22 of the integrating or positive displacement type. The elements of said mechanism are as follows: Rotatably located upon the base-plate 20 is a flat plate 23 of circular contour except in so far as hereinafter set forth and adapted to be continuously rotated in a counter-clockwise sense, about an axis, as in being carried by a spindle 24 rotated by means of a constant-speed electric motor 25. Oscillatably mounted on the base-plate 20 is an arm or pointer 26 adapted to swing through a limited angle about a spindle 27, said arm being substantially rigid in its normal plane of motion, and resilient in a sense perpendicular to said plane. The extremity of said arm is adapted to excurse over said plate 23 with motion of the arm in a sense substantially radial to said plate, the limited arc of excursion of said extremity lying between the circumference of plate 23 and the spindle 24.

Mounted upon, and carried by, the plate 23, and adapted to be rotated therewith, is a smooth, flat, scroll plate 28 having a leading edge 29 and a trailing edge 30. The leading edge 29 is conformed to a circular arc of a radius equal to the length of said arm 26, and the relative positioning of the respective spindles 24 and 27 is so selected that at one position of said scroll plate in its rotation said leading edge coincides with the arc of deflection of the extremity of said arm. The trailing edge 30 is conformed to a spiral extending uniformly from a maximum to a minimum radius on the scroll plate and subtending an angle a somewhat less than the full angle of 360° represented by one revolution of the scroll plate. For example, the angle a may be taken as 288° or four-fifths of a complete revolution, the remaining one-fifth revolution being represented as the angle b.

Transversely of the base-plate 20 and oscillatably mounted thereon as by journal members 31, is extended a shaft 32 adapted to be rocked through a limited angle about its axis in a sense perpendicular to, and not intersecting, the spindle 24. Fixed to the shaft 32 is a rocker-plate 33, normally lying in front of, and substantially parallel to, the scroll plate 28, so that said scroll plate in its rotation passes between said rocker-plate and the circular plate 23.

Carried by the extremity of the arm or pointer 26 is a rider or stud 34 which normally swings freely between the plate 23 and the rocker-plate 33 with excursion of the arm 26. This stud has a sloping rearward face adapted to be engaged by the leading edge 29 of the scroll plate 28 and thereby deflected in a sense perpendicular to its normal excursion to engage the rearward face of the rocker-plate 33 and in turn deflect it and thereby rotate the shaft 32 through a slight angle. A friction pad 35 of cork or the like affixed to the rearward face of the rocker-plate 33 provides a bearing surface for the stud 34, and resists any tendency of the stud to movement in its normal path of excursion during such time as it may be engaged with said pad.

Fixed to the shaft 32 and normally lying substantially parallel to the face of the plate 20 is an extended arm 36 carrying on its extremity a light vane 37 of ferromagnetic material. Mounted upon the base-plate 20, and juxtaposed to the vane 37, is a magnetically operated vacuum-type mercury switch 38 of the class, for example, set forth and described in U. S. Letters Patent #2,085,316 issued to K. Hunicker June 29, 1937. Adjacent said switch and spaced therefrom sufficiently to permit free movement of the vane 37 in its normal excursion with rotation of the shaft 32, is a small permanent magnet 39.

The operation of the switch 38 will be more fully understood by reference to Figs. 3, 4, 5, and 6. The relative positions of elements of the switching mechanism are shown for an open-circuit condition in Figs. 3 and 4; and for a closed-circuit condition in Figs. 5 and 6. The switch element consists of an elongated enclosing envelope 40 of glass or other insulating material, adapted to be mounted in a vertical position and having in its lowest portion a globule of conducting liquid, such as mercury. Sealed in the wall of the envelope 40 are two electrodes, a fixed electrode 41 permanently dipping into the globule of liquid, and a movable electrode 42 having a resilient portion 43 and a rigid contact portion 44 adapted to be maintained by the action of said resilient portion in contact with said liquid, thus providing a complete electrical circuit between said electrodes, said elements normally occupying the relative positions shown in Fig. 6. For operation of the switch, there is fixed to the portion 44 of the electrode 42 a small ferromagnetic armature 45. The permanent magnet 39 is juxtaposed to the envelope of the switch as shown in Fig. 4, and the field thereof, acting on the armature 45, will attract the same toward the wall of the envelope, withdrawing the contact element from the liquid and interrupting the electrical circuit. The vane 37 carried by the arm 36 is in the position shown in Fig. 3, where the vane is withdrawn from the magnetic circuit, permitting the flux to reach and act upon the armature 45, as hereinbefore described, interrupting the electrical circuit through the switch.

Figs. 5 and 6 are views corresponding to Figs. 3 and 4 respectively and show the several elements of the switch in the position assumed when the arm 36 is so moved that the vane 37 enters the air gap in the field of the magnet 39. Under this condition a large portion of the flux will be shunted through the vane and diverted from the armature 45, causing the same to be released and the contact 44 under the resilient action of the part 43 brought into engagement with the liquid, completing the electrical circuit through the switch. In Fig. 7 is shown a switch similar in all respects to the above, but having a contact arrangement whereby the circuit is closed when subjected to the attraction of a magnet, and opened when not so attracted. The mechanical action of these circuit-controlling devices is substantially identical with that set forth in the co-pending application of F. B. Bristol, Serial No. 266,299, filed April 6, 1939, now issued as U. S. Patent #2,214,159, for improvements in Telemetering transmitters, and assigned to applicants' assignee. A further feature, pointed out in said application, is found in the fact that the magnetic pull of the magnet on the vane 37 tends to move the latter into the air gap, thus providing the requisite resiliency of action and obviating the necessity for a spring to constrain the motion of the arm 36 and the shaft 32 or for a stop to prevent excessive motion of said elements away from the plane of the base plate 20.

Fixed at one end to the base-plate 20 is an extended arm 50 resilient in a sense perpendicular to, and substantially rigid in a sense parallel to, the face of said plate, and having its free extremity positioned in the space between the rocker-plate 33 and the rotating circular plate 23. The scroll plate 28 bears near its circumference an arcuate portion 51 having a beveled leading edge 52 and a trailing edge 53 located on a radius corresponding to the point in the circumference at which is attained the maximum radius of the spiral trailing edge 30 of the scroll plate. Carried by the extremity of the arm 50 is a rider 54 having a sloping face adapted to be engaged by the advancing edge 52 and deflected thereby through a small angle in a sense perpendicular to the plane of travel of the scroll plate. The rider 54, positioned behind the rocker-plate 33, is so proportioned that upon its deflection it will engage the rear face of the same, deflecting it, rotating the shaft 32, and causing the arm 36 to move the vane 37 out of the air gap of the magnetic switch 38, whereby the latter, as hereinbefore set forth, will act in a sense to open its electrical contacts.

Oscillatably mounted upon the base-plate 20, as by journal members 55, is an extended arm 56 adapted to swing through a limited angle about an axis preferably parallel to, or in line with, the axis of shaft 32 in a sense perpendicular to the plane of rotation of the plate 23. The plate 23 has near its periphery a projecting portion 57 having a sloping leading edge 58 and a trailing edge 59. Fixed to the arm 56 is a projection 60 carrying a rider 61 adapted to be engaged by the leading edge 58 and to rest upon the face of the portion 57 and to be released by its trailing edge 59, whereby said arm may be deflected through its limited angle of movement by said engagement. A transverse portion 62 of the arm 56 projects into the plane of deflection of the resilient arm 50 in a manner that, should said arm 50 be deflected by engagement with the arcuate portion 51 of the scroll plate 28, said projection will be engaged by said arm 50, whereby arm 56 will be retained in its deflected position though not in engagement with the arcuate portion 57 of the plate 23. The angular positioning of the scroll plate 28 with respect to the circular plate 23 upon which it is mounted is made such that the leading edge 58 of the arcuate portion 57 of the latter plate and the trailing edge 53 of the arcuate portion 51 of the former plate subtend at the axis 24 the angle $b$ hereinbefore referred to and being one-fifth the total angle of revolution.

Juxtaposed to the extremity of the arm 56 is a magnetically operated mercury switch 63 identical to the switch 38 hereinbefore described, and subject to actuation by the field of a permanent magnet 64 as modified by a ferromagnetic vane 65 carried by the arm 56, in a manner that when said arm is in its undeflected position the contacts of switch 63 are closed, and opened when the arm is deflected by engagement with the arcuate portion 57 or by support of the arm 50 through the projection 62.

The field of the permanent magnet 64 acting upon the vane 65 provides a force tending to move the vane into the gap between said magnet and the switch 63, thus eliminating the need for a spring or for a stop to limit the deflection of the arm 56 when lifted by engagement of the rider 61 with the portion 57 of the plate 23.

Deflection of the arm 26 in response to operation of the meter 22 is effected through the medium of a gear train including a shaft 70 directly driven from the mechanism of the meter and rotating at a velocity proportional to the rate of flow through the same. Fixed upon the shaft 70 is a gear member 71 and rotatably mounted on the base-plate 20 is a gear member 72 meshing with the gear 71 and having fixed to it a pinion 73. Rotatably mounted on the base-plate 20 is a gear member 74 meshing with the pinion 73 and having fixed to it a pinion 75. Carried by the spindle 27 and attached to the arm 26 is a gear member 76. Rotatably mounted on the base-plate 20 is a pinion 77, having attached thereto a gear member 78. Coaxially with the gear member 78 is mounted a bell-crank 79 having two arms, one of which carries a pinion 80 meshing with the gear member 78 and adapted when so positioned by deflection of the bell-crank to mesh also with the pinion 75, thus completing a positive mechanical train from the meter 22 to the pointer 26. A tension spring 81 extended between an arm of the bell-crank 79 and a post on the base-plate 20 tends to maintain the pinions 80 and 75 in mesh, under which condition normal rotation of the meter 22 will cause the pointer 26 to excurse toward the circumference of the plate 23 or toward the left side as seen in Fig. 1.

An electromagnet 82 mounted on the base-plate 20 is adapted when energized to attract a ferromagnetic armature 83 carried by an arm of the bell-crank 79 in a sense to oppose the influence of the spring 81, separating the pinions 80 and 75 and interrupting the mechanical train between the meter 22 and the arm 26. A tension spring 84 extended between points of attachment on the arm 26 and the base-plate 20 respectively, tends to urge said arm toward its right-hand or zero position, said position being defined by a stop member 85 mounted on the base-plate 20. This stop member is to be engaged by the arm 26 as it assumes a position wherein the stud 34 carried thereby approaches the portion of the scroll plate having minimum radius of operation as the principle of the class of telemetering systems upon which the present invention is based requires that each cycle of operation be characterized by the initiation and the termination of an impulse, and that at no time may an impulse be either continued or withheld for an interval quite as long as that of a normal cycle, and the position of a stop member 85 is made such that when the arm 26 is in engagement therewith, the stud 34 will drop off the spiral edge 30 prior to the engagement of the rider 54 by the edge 52. It is thus assured that whatever the position of the arm 26, an impulse will be interrupted at least momentarily once in every cycle of operation.

The instrument 21 is of the class fully set forth and described in U. S. Letters Patent #2,040,918 issued to C. W. Bristol May 19, 1936, in which, through the agency of suitable electromagnetically controlled clutch elements, a constantly driven mechanism is caused to position a pointer in accordance with the relative durations of cyclically recurring impulses in an electrical circuit. This instrument may be either of the indicating or the recording form.

The electrical circuits by means of which the several elements of the device are operatively coordinated are as follows: The controlling, or impulse-transmitting, circuit of the receiving instrument 21 consists of two conductors 90 and 91, the former being directly connected to one side of a source of electrical supply 92, and the latter, in series with the magnetically-actuated switch 38 and a conductor 93, to the other side of said source of supply. One terminal of the electromagnet 82 is connected by means of a conductor 94 to one side of said power source, and the other terminal of said electromagnet, by means of a conductor 95 which includes in series switch 63 and a conductor 96, is connected to the other side of said source. The constant-speed motor 25 is also connected to the source of electrical power. While the three electrical elements herein shown are indicated as being connected to a common source of supply, this connection is not essential to the operation of the device; and, should it seem expedient to do so, the circuits may be separated and supplied from individual sources.

The operation of the instrument embodying the invention, as has thus far been disclosed, may be explained as follows. It may first be assumed that the rotating parts are in a position where the three elements—the followers 61 and 54 and the stud 34—which engage the rotating parts are disengaged from the same, i. e., within the angle a. Under this condition, the contacts of the switches 38 and 63 will be closed. Upon energization of the source of supply 92, the motor 25 will be caused to operate and rotate the shaft 24 and parts carried thereby at a constant speed in a counter-clockwise sense. Current will be free to pass through the contacts of the switch 38 and the associated circuits to the receiving instrument 21. The contacts of switch 63 being closed, the electromagnet 82 will be energized and the gear train inoperative. The cycle of operation may be assumed as beginning at the instant when the leading edge 58 of the arcuate portion 57 engages the rider 61, carried by the part 60 of the arm 56. Consideration may first be given to the action and interaction of the several elements which engage the rotating parts and the rocker-plate 33, and the performance of the electrical circuits and circuit-controlling devices in response to these actions.

As the edge 58 passes beneath the rider 61, the arm 56 will be deflected outward from the base-plate 20 and, as hereinbefore set forth, the switch 63 actuated to open its contacts, de-energizing the electromagnet 82 and completing the gear train through pinions 80 and 75. As the rotating element continues its motion, and while the rider 61 is yet supported by the arcuate portion 57 of the plate 23, the leading edge 52 of the scroll plate 28 will engage the rider 54 on the arm 50, deflecting the same in a sense perpendicular to the plane of movement of the rotating parts, and actuating the rocker-plate 33 and attached elements, to cause the switch 38 to open its contacts. This effects interruption of the electrical circuit through the receiving instrument 21 and defines one end of an impulse to which the mechanism of said instrument is adapted to respond. Immediately after the engagement of the rider 54 by the edge 51, the stud 34 on the pointer 26 will be engaged by the leading edge 29 of the scroll plate and lifted onto its smooth surface. At this part of the cycle the rider 61 is disengaged by the trailing edge 59 of the portion 57 of the plate 23. Under the influence of the field of magnet 64 acting on the vane 65, the arm 56 will tend to be moved into its position toward the plate 20; but the projecting part 62 will be obstructed by the arm 50 in its deflected position and such motion of the arm 56 prevented. Shortly after engagement of the stud 34 by the leading edge 29, the rider 54 will be released by the trailing edge 53, allowing the arm 56 to return to its undeflected position and the contacts of the switch 63 to be closed, energizing the electromagnet 82, which will move the bell-crank 79 to a position where the gears 80 and 75 are separated and the mechanical train between the meter 22 and the arm 26 interrupted. At the same time, the rocker-plate 33, being deprived of the support of the rider 54, will drop through a small angle until the friction pad 35 on its rearward face engages the stud 34, preventing return of the arm 26 to zero by the spring 84.

The stud 34 will now remain in engagement with the scroll plate 28, resting upon its smooth flat forward face, until disengaged by the spiral trailing edge 30 at which time the rocker-plate 33 will be released and the vane 37 carried by the arm 36 attracted into the air gap of the magnet 39, shunting its flux and causing the switch 38 to close its contacts, thus defining another end of an impulse to which the mechanism of receiving instrument 21 is adapted to respond. It will thus be apparent that with continued operation of the rotating parts of the device, the magnet 82 will be alternately energized and de-energized for definite intervals, and that there will be transmitted to the instrument 21 a series of cyclical electrical impulses, each impulse having one end recurring invariably at a definite instant in the cycle, as determined by engagement between the edge 52 and the rider 54, and the other end determined by disengagement between the spiral edge 30 and the stud 34.

It will be obvious that, because of the spiral conformation of the trailing edge 30 of the scroll plate 28, the relative durations of "on" and "off" periods of the switch 38, and hence of impulses transmitted to the receiving instrument 21, will be dependent upon the excursion of the pointer 26 from its zero position against the stop 85. It may first be assumed that no flow is passing through the meter 22 so that the shaft 70 will be at rest and no rotation will be imparted to the gear train therefrom. At each of the cyclical energizations of the electromagnet 82, the mechanical train will be interrupted by separation of the pinions 80 and 75, at which time the arm 26 will be free to move to its zero position against the stop 85 under influence of the spring 84. Since no rotation is being imparted to the gear train from the meter, completion of said train by de-energization of the magnet 82 will not cause the arm to depart from its zero position; and, so long as the meter remains at rest, there will be imparted to the instrument 21 recurrent impulses of equal duration, representative of a zero rate of flow; and the pointer or pen of the instrument 21 will assume a position corresponding to the relative durations of these impulses, and produce on the scale or chart of that instrument a zero indication.

It may now be assumed that flow through the meter 22 is permitted to take place, causing the meter mechanism including the shaft 70 to rotate at a corresponding speed, driving the gear 72 and pinion 73 in a clockwise sense and the gear 74 and pinion 75 in a counter-clockwise direction. Due to the interruption of the mechanical train by separation of the pinions 80 and 75 so long as the electromagnet 82 is energized, no motion will be transmitted to the arm 26 so long as either of the riders 61 and 54 remains within the angle $a$, and the pointer 26 will remain in its zero position. Immediately upon engagement of the rider 61 by the edge 58, the electromagnet 82 will become de-energized to release the armature 83, and allow the spring 81 to move the bell-crank 79 to a position where the pinions 80 and 75 are meshed. This completes the mechanical train, whereupon the pinion 80 will be rotated in a clockwise sense, the gear 78 and pinion 77 in a counter-clockwise sense, and the gear 76 in a clockwise sense, whereby the pointer 26 is caused to excurse away from its zero position and toward the outer diameter of the scroll plate at a rate proportional to the rate of the meter 22. While the pointer 26 is thus being moved to a position determined by its rate of travel, the edge 52, as hereinbefore set forth, will engage the rider 54, actuating the rocker-plate 33 and defining one end of an impulse applied to the receiving instrument 21.

The engagement of the stud 34 by the edge 29 and the release of the rider 61 by the edge 59, and the consequent transfer of support of the arm 56 to the arm 50 through the medium of projection 62, will be carried out as hereinbefore set forth, the contacts of switch 63 remaining open and the electromagnet 82 de-energized. This allows the arm 26 to be advanced at a rate proportional to that of the meter 22, until the rider 54 is released by the trailing edge 53 with consequent closing of the contacts of switch 63 and energization of magnet 82. As the rider 54 is released by the trailing edge 53, the stud 34 will be clamped between the friction pad 35 on the rearward face of the rocker-plate 33 and the smooth surface of the scroll plate 28. At the same time, separation of the pinions 80 and 75 due to energization of the magnet 82 will disengage the pointer 26 from the meter mechanism, so that as the scroll plate rotates the said pointer will remain in its deflected position representative of the average speed of the meter during the time interval represented by the angle $b$. The positioning of the pointer 26 during the time interval represented by the engagement of the pinions 75 and 80 is equivalent to the performance of the conventional "block-interval" class of demand meters. As the scroll plate continues to rotate, the spiral trailing edge 30 will ultimately pass beneath the stud 34, releasing the same and, as hereinbefore set forth, causing the switch 38 to be actuated, thus defining the duration of an impulse transmitted to the receiving instrument 21. Upon release of the stud 34 the pointer 26 will be free to swing; and, mechanical connection to the meter 22 being interrupted due to continued energization of the electromagnet 82, said pointer, under the influence of the spring 84, will force the stud 34 against the trailing edge 30 and will approach its position of zero deflection as said stud follows said edge with rotation of the scroll plate 28, until the arm 26 engages the stop 85 corresponding to said zero position. This condition will be maintained for a short interval as hereinbefore set forth until the rider 61 is again engaged by the edge 58 and a new cycle of operation initiated.

Because of the spiral form of the edge 30, the time of release of the stud 34 will be dependent upon the deflected position of the arm 26 so that the reading of the instrument 21 as determined once in each cycle of operation will be a measure of the average speed of the meter 22 during a selected and constant time increment within that cycle; and if the instrument 21 is of a recording form, there will be provided a continuous graph representative of the flow through the meter 22.

In Figs. 8 to 12, inclusive, is shown an alternative form of translating device embodying the essential principles of the invention, but differing in certain details from the form hereinbefore set forth. As indicated, a base-plate 99 has mounted thereon the principal elements of the invention, including a rotatable shaft or spindle 100 having affixed thereto a gear member 101 whereby said shaft may be rotated through a limited angle, a gear train 102 identical with that shown in Fig. 1 and whereby said gear may be driven at a speed proportional to that of a meter or revolution counter M and, operatively associated with said gear train, an electromagnet 103 adapted when energized to interrupt the continuity of said train and render the same inoperative.

Carried by the spindle 100 (Fig. 10) are three arms, a short arm 104 free to rotate upon the spindle, a short arm 105 fixed to the spindle and rotatable therewith, and an arm or pointer 106 free to rotate upon the spindle and having an extended part substantially rigid in its normal plane of rotation and slightly resilient in a direction perpendicular thereto. A fixed stop 107, adapted to be engaged by the arm 105, serves to limit rotation of the latter in a counterclockwise sense and determines a definite zero of excursion. A projection 108 of the arm 104 extending perpendicular to its plane of rotation is adapted to be engaged by the arms 105 and 106, determining, when so engaged, a definite position relationship among said three arms. A spring 109 extended between projection 108 and a suitably formed portion of arm 105 serves normally to maintain engagement between said last-named arm and said projection; and a spring 110 extended between projection 108 and a suitably formed portion of arm 106 serves to maintain engagement between arm 106 and said projection. It will be seen that under normal conditions said springs act to consolidate said three arms into a resilient unit as shown in Fig. 10, rotatable with the spindle 100, but yieldable to permit forcible deflection of the arm 106 in either direction of rotation relative to said spindle. A spring 111 extended between the projection 108 and a suitably positioned post 112 on the base 99 serves normally to maintain said three arms, together with the spindle 100 and the gear member 101, in a definite position of zero deflection, as determined by the stop 107.

Pivotally mounted upon the base-plate 99 is a circular flat plate 113 adapted to be continuously rotated in a counter-clockwise sense about an axis or spindle 114 by means of a constant-speed motor 115. The relative positioning of the spindles 100 and 114 is made such that the extremity of the pointer 106, in deflecting through a limited angle about the spindle 100, will excurse over the circular plate 113 in a sense substantially radial to said plate; and, when the pointer and associated elements are maintained by the spring 111 in their position of zero deflection, said extremity will occupy a position relatively near the center of rotation of said plate.

Mounted upon and carried by the circular plate 113 and adapted to be rotated therewith is a flat smooth scroll plate 116 having an arcuate leading edge 117 and a spiral trailing edge 118, conformed and disposed in a manner substantially identical with the corresponding edges 29 and 30 of the form of the invention shown in Fig. 1.

Transversely of the base-plate 99 and pivotally mounted thereon is extended a shaft 119 adapted for rotation through a limited angle about its axis in a sense perpendicular to, but not intersecting, the spindle 114. Fixed to the shaft 119 is a flat rocker-plate 120 lying in front of, and normally in substantial parallelism to, the plates 113 and 116, so that the scroll plate 116 in its rotation passes between said rocker-plate and the circular plate 113.

Carried by the extremity of the arm 106 is a stud 121 normally swinging freely between the plates 113 and 120 with excursion of the arm 106. A friction pad 122 affixed to the rearward face of the plate 120 provides a bearing face for the stud 121 when, as hereinafter set forth, said stud is brought into engagement with said plate, and resists any tendency of the stud 121 or the pointer 106 to move in their normal path of excursion during the time such engagement may exist. Fixed to the shaft 119 is an extended arm 123 carrying on its extremity a ferromagnetic vane 124 adapted upon motion of said arm in response to deflection of the rocker-plate 120 and in conjunction with a small permanent magnet 125 to actuate a mercury switch 126 structurally and operatively identical with switch 38, fully described in connection with the form of the invention shown in Fig. 1.

Fixed at one end of the base-plate 99 is an extended arm 127 resilient in a sense perpendicular to, and substantially rigid in a sense parallel to, the face of said plate, and having its free extremity positioned in the space between the rocker-plate 120 and the rotating circular plate 113. The scroll plate 116 bears near its circumference an arcuate portion 129 having a beveled leading edge 130 projecting circumferentially somewhat in advance of the leading edge 117, and having a trailing edge 131 located on a radius corresponding to the point in the circumference at which is attained the maximum radius of the spiral trailing edge 118. Carried by the extremity of the arm 127 is a rider 132 having a sloping face adapted to be engaged by the advancing edge 117 and thereby deflected through a small angle in a sense perpendicular to the plane of travel of the scroll plate. The rider 132, positioned behind the rocker-plate 120, is so proportioned that upon its deflection it will engage the rear face of the same, deflecting it, and thereby, as hereinbefore set forth, causing the switch 126 to open its contacts.

Secured to and movable with the rocker-plate 120 is a bow 133 formed of light spring wire, said bow having end portions 134 projecting away from the shaft 119 and a bridge portion 135 curved to an arc substantially concentric about the axis of the spindle 100, and normally lying in a plane parallel to and slightly in front of the plane of excursion of the pointer 106. Fixed upon the pointer 106 is a hook portion 136 embracing the arcuate portion 135 of the bow 133, and so disposed that, as the pointer moves to various positions in its range of excursion, the said arcuate portion at all times lies within the said hook portion and is normally out of contact therewith.

Oscillatably mounted upon the base-plate 99 and adapted to swing through a limited angle about an axis preferably parallel to, or in line with, the axis of shaft 119, is an extended arm 137 bearing upon its free extremity a ferromagnetic vane 138 adapted in conjunction with a small permanent magnet 139 to actuate a mercury switch 140 of the form and arrangement shown in Fig. 7. Carried by the arm 137 is a transverse portion 141 projecting into the path of the resilient arm 127 and adapted to be lifted by the same when the latter is deflected by engagement of the rider 132 with the edge 130, the proportioning and disposition of elements being such that when said rider rests upon the arcuate portion 129 the contacts of switch 140 will be closed, and when the arm 127 is in its undeflected position, said contacts will be open.

The electromagnet 103 is energized from a source of electrical supply 142 through a circuit 143 including switch 140, whereby said magnet is rendered responsive to the movements of arm 137 to complete or interrupt the gear train whereby the gear member 101 is rendered subject to meter operation. A receiving instrument 144, identical in all respects to the instrument 21 shown in Fig. 1, is provided having an impulse-responsive system energized from the source 142 through a circuit 145, including the switch 126 whereby said instrument is made responsive to impulses controlled by said switch and adapted to provide a measure representative of the successive durations of said impulses.

Following is the operation of the device in the form shown in Figs. 8 to 12, inclusive: It may first be assumed that the rotating parts are in a position where the stud 121 and the rider 132 are disengaged therefrom. Under this condition, the contacts of the switch 126 will be closed, while those of the switch 140 will be open. Current will pass through switch 126 to the receiving instrument 144; and electromagnet 103 will be de-energized. Current from the source 142 will pass through the windings of the motor 115 causing it to operate and to rotate the shaft 114 and all parts carried thereby at a constant speed in a counterclockwise sense.

The cycle of operation may be assumed as beginning at the instant when the leading edge 130 of the arcuate portion 129 engages the rider 132 carried by the arm 127. As the edge 130 passes beneath the rider, the arm 127 will be deflected outward from the base-plate; and, as the rider engages the rear face of the rocker-plate 120, the arm 123 will be deflected in a sense to open the contacts of the switch 126, thus determining one end of an impulse in the electrical circuit to the receiving instrument 144. At the same time, the arm 137, being deflected by the action of the arm 127 on the projecting part 141, will act to close the contacts of switch 140, energizing the electromagnet 103. The bow 133, being attached to the rocker-plate 120, will be deflected away from the base-plate 99 and will engage the hook portion on the pointer 106, deflecting said pointer in the same sense, and perpendicularly to its normal plane of excursion. The deflecting of the arm 106 will act to bring the stud 121 into engagement with the friction pad 122 on the rearward face of the rocker-plate 120, clamping the arm 106 against movement in its normal plane of excursion. Thus, to recapitulate, engagement of the rider 132 by the edge 130 effects a threefold result; first, determination of one end of an impulse in the transmitting circuit; second, energization of the electromagnet 103; and, third, clamping of the pointer 106 against the rocker-plate 120. This operation is so timed in the cycle that immediately after the lifting of the stud 121 out of the path of the scroll plate 116 the leading edge 117 of the latter passes beneath the stud and the circular plate 113.

As the scroll plate 116 continues its rotation, the edge 131 of the arcuate section 129 will pass beneath the rider 132, releasing the arm 127, and with it the arm 137, which, under the influence of the magnet 139 acting on the vane 138, will be deflected to a position to cause the contacts of switch 140 to be opened and the electromagnet 103 to be de-energized. At the same time, the rocker-plate 120 will be released, and, under the influence of the magnet 125 acting on the vane 124, will tend to be deflected toward the plate 116. It will, however, be limited in such deflection by engagement of the stud 121 with the smooth face of the scroll plate 116, so that the contacts of switch 126 will remain open so long as the stud rests upon the scroll plate. At the same time the clamping action of the friction pad 122 will be continued, inhibiting any motion of the pointer 106 in its normal plane of excursion. Upon subsequent release of the stud 121 by the trailing edge 118 of the scroll plate, the rocker-plate will swing to its normal position, rendering the pointer 106 free to move in its normal plane of excursion, and at the same time causing the contacts of switch 126 to be closed, thus determining the length of an impulse in the electrical circuit to the receiving instrument 144.

Consideration may now be given to performance of the device when the mechanical train 102 is being driven by the device M at a speed to be indicated or recorded or at a velocity proportional to a rate of flow or a similar magnitude measured by said device.

It has already been pointed out how at the time of engagement of the rider 132 by the leading edge 130, one end of an impulse in the transmitting circuit 145 is determined and the pointer 106 clamped in whatever part of its path of excursion it may at that instant occupy, the relative positions of the arms 106, 105, and 104 being as shown in Fig. 10 of the drawings. Simultaneous energization of the electromagnet 103 will interrupt the mechanical train 102, whereupon the spring 111 will act to move the lever system in a counter-clockwise sense. The pointer 106, being clamped, cannot be moved by the forces available but the arm 104 will respond to the influence of the spring 111, the spring 109 will maintain arm 105 in contact with part 108 of the arm 104, and the spring 110 will yield, allowing arms 104 and 105 to be moved as a unit toward the stop 107, as shown in Fig. 11, while the pointer 106 remains in its clamped position. Immediately upon release of the arms 127 and 137, the contacts of switch 140 will be opened, de-energizing the magnet 103 and re-establishing the mechanical train 102, whereupon the gear member 101, the spindle 100 and the arm 105 will begin to excurse in a clockwise sense at a rate proportional to that of the metering device. The spring 109 being so proportioned with respect to the spring 111 as to overcome any tendency of the latter to separate the arms 104 and 105, the latter arm will remain in engagement with the former, and the two arms will progress toward the clamped position of the pointer 106.

Should release of the pointer 106, due to the trailing edge 118 of the scroll plate passing beneath the stud 121, take place before said position is attained by the arms 104 and 105, the spring 110 will act to bring the pointer 106 into engagement with the projection 108, thus completing the unitary arrangement shown in Fig. 10. Thereupon, the three arms will be advanced as a unit until a cycle of operation is completed and the pointer 106 again clamped, with simultaneous release of the arms 104 and 105 and their substantially instantaneous setting to zero.

Should the advance of the arms 104 and 105 bring the part 108 into engagement with the pointer 106 before it is released by the scroll plate, as might occur when the speed of the train 102 during one cycle is materially in excess of its speed during the preceding cycle, the arm 104 will cease to advance with the arm 105, but the latter arm will continue to advance, the spring 109 yielding to permit of this action without abnormal straining of any part of the mechanism. Upon release of the pointer 106 from clamping engagement, the spring 109 will act to restore said pointer and arm 104 to engagement with arm 105, the three elements then, as before, being advanced as a unit until a cycle of operation is completed. Thus, it will be seen that during each cycle of operation the pointer 106 is positioned to represent the advance of the metering device during a predetermined portion of that cycle, and, since the time interval is constant, the excursion of the pointer 106 will represent the average speed of the metering device during that interval. The position of the pointer in turn determines the duration of an impulse in the receiving instrument. Also, with a minimum time of interruption, the pointer 106 still performing its function in determining the length of an impulse, the positioning mechanism is restored to zero and measurement of the mean meter velocity for the succeeding cycle initiated.

In Fig. 13 is shown a method by which a translating device embodying the principles of the invention may be remotely operated through an electric circuit from contacts actuated by a continuously running meter at a remote location. As indicated, a ratchet wheel 150 forms a part of a mechanical train, and may, for example, be made to replace the gear 72 in the train shown in Fig. 1. A pawl 151 carried upon an arm 152, reciprocable about the axis of the ratchet wheel 150, serves to advance said ratchet wheel with each oscillation of the arm. A pawl 153, acting about a fixed center, serves to maintain said ratchet wheel in its advanced position and prevents retrogression with return movement of the arm 152. An electromagnet 154, adapted to act upon a ferromagnetic armature 155 carried by the arm 152, serves by its energization and de-energization to impart reciprocatory movements to said arm. A meter 156, which may be a fluid flow meter of the displacement type, a watthour meter, an anemometer, or any other form of integrating or counting meter, carries upon a shaft 157 a cam 158. Electrical contacts 159 adapted to be actuated by said cam 158 and included in a circuit 160 with a source of electrical energy 161 and the electromagnet 154 serve to render said magnet responsive to the rotation of the shaft 157 to advance the ratchet wheel 150 at a rate proportional to the speed of the meter 156, and therefore to the rate of flow of the medium which said meter is adapted to measure. The mechanism operatively associated with the ratchet wheel 150 being in all respects identical with either of the two alternative forms hereinbefore set forth, the combination provides means for effecting an indication or record of the magnitude measured by said meter at a location remote from the translating equipment.

In Fig. 14 is shown diagrammatically the performance of the three riders 61, 54 and 34 respectively over a time period approximating three cycles of operation. During each cycle the rider 61 is actuated for a fixed interval (in this instance about one-fifth the total period of the cycle). During this interval, the pointer 26 (in Fig. 1) is moved through a distance corresponding to the total advance of the meter, in the interval; and at the termination of the interval the pointer comes to rest in a position representing this advance. Prior to release of the rider 61 the rider 54 is engaged by the leading edge 52, thus initiating an impulse in the circuit to the instrument 21. As the rider 61 is released, the rider 34 is engaged, maintaining the impulse initiated by engagement of the rider 54. The rider 34 remains in engagement with the scroll-plate until released by the trailing edge of the same, thus terminating the impulse. The duration of engagement of the rider 61 and the duration of engagement of the rider 54 are each fixed intervals defined by the construction and adjustment of the instrument. The durations of successive impulses, as represented by $d_1$, $d_2$, and $d_3$ in Fig. 14, correspond to the respective intervals from the engagement of the rider 54; and these intervals will vary with the position assumed by the pointer 26 during the interval of engagement of the rider 61, and therefore with the average speed of the meter during that interval. The range of impulse durations may vary from $d'$ to $d''$ in Fig. 14, the former representing the impulse corresponding to zero velocity of the meter, and the latter to the maximum speed for which the instrument is adapted.

We claim:

1. In a measuring device: the combination of a rotating part whose rate of rotation is to be made the basis of a measurement, a translating device having an element, a stop, and resilient means normally tending to maintain said element in engagement with said stop, a pointer operable by said element, and means including a mechanical train for periodically providing operative connection between said element and said part for successive uniform time intervals whereby said element will be deflected from said stop in opposition to the influence of said resilient means and said pointer will be caused to excurse along a fixed path from a reference position corresponding to engagement between said element and said stop to a deflected position representative of the mean rate of rotation of said part during the latest of said intervals, means for retaining said pointer in said deflected position after each of said intervals, means operative during each retention of said pointer to establish an impulse of duration dependent upon said deflected position with respect to said reference position, means for releasing said pointer from said deflected position and permitting it to return to said reference position under the influence of said resilient means, together with an instrument responsive to said impulses and having a movable member adapted to be positioned in response to successive impulses to provide a measure dependent upon their durations.

2. In a measuring device: the combination of a rotating part whose rate of rotation is to be made the basis of a measurement, a translating device having an element, a stop, and resilient means normally tending to maintain said element in engagement with said stop, a pointer operable by said element, and means including a mechanical train for periodically providing operative connection between said element and said part for successive uniform time intervals whereby said element will be deflected from said stop in opposition to the influence of said resilient means and said pointer will be caused to excurse along a fixed path from a reference position corresponding to engagement between said element and said stop to a deflected position representative of the mean rate of rotation of said part during the latest of said intervals, means for retaining said pointer in said deflected position after each of said intervals, means operative during each retention of said pointer to establish an impulse of duration dependent upon said deflected position with respect to said reference position, means for releasing said pointer from said deflected position and permitting it to return to said reference position under the influence of said resilient means, and means for controlling the return of said pointer to its reference position, together with an instrument responsive to said impulses and having a movable member adapted to be positioned in response to successive impulses to provide a measure dependent upon their durations.

3. In a measuring device: the combination of a rotating part whose rate of rotation is to be made the basis of a measurement, a translating device having an element, a stop, and resilient means normally tending to maintain said element in engagement with said stop, a pointer operable by said element, and means including a mechanical train for periodically providing operative connection between said element and said part for successive uniform time intervals whereby said element will be deflected from said stop in opposition to the influence of said resilient means and said pointer will be caused to excurse along a fixed path from a reference position corresponding to engagement between said element and said stop to a deflected position representative of the mean rate of rotation of said part during the latest of said intervals, means for retaining said pointer in said deflected position after each of said intervals, means for initiating an impulse at a definite instant with respect to each of said intervals, means for terminating said impulse and including a member adapted to be moved at a uniform velocity and to be engaged by said pointer at any position in its path and having an obliquely disposed trailing edge over which said pointer may pass at an instant dependent upon said deflected position with respect to said reference position, and means actuated by said pointer when passing over said edge to terminate said impulse, together with an instrument responsive to said impulses and having a movable member adapted to be positioned in response to successive impulses to provide a measure dependent upon their durations.

4. In a measuring device: the combination of a rotating part whose rate of rotation is to be made the basis of a measurement, a translating device having an element, a stop, and resilient means normally tending to maintain said element in engagement with said stop, a pointer operable by said element, and means including a mechanical train for periodically providing operative connection between said element and said part for successive uniform time intervals whereby said element will be deflected from said stop in opposition to the influence of said resilient means and said pointer will be caused to excurse along a fixed path from a reference position corresponding to engagement between said element and said stop to a deflected position representative of the mean rate of rotation of said part during the latest of said intervals, means for retaining said pointer in said deflected position after each of said intervals, said train including yielding means, weak as compared with said resilient means, adapted normally to retain said pointer in engagement with said element and to yield under the influence of said resilient means to permit said element to be returned to the stop when operative connection provided by said train is interrupted and while said pointer remains retained in its deflected position, and tending to restore said pointer to a position corresponding to that of said element when said pointer is released, means operative during the retention of said pointer to establish impulses of durations dependent upon said deflected position with respect to said reference position, together with an instrument responsive to said impulses and having a movable member adapted to be positioned in response to successive impulses to provide a measure dependent upon their durations.

5. In a measuring device: the combination of a rotating part whose rate of rotation is to be made the basis of a measurement, a translating device having an element, a stop, and resilient means normally tending to maintain said element in engagement with said stop, a pointer operable by said element, and means including a mechanical train for periodically providing operative connection between said element and said part for successive uniform time intervals whereby said element will be deflected from said stop in opposition to the influence of said resilient means and said pointer will be caused to excurse along a fixed path from a reference position corresponding to engagement between said element and said stop to a deflected position representative of the mean rate of rotation of said part during the latest of said intervals, means for retaining said pointer in said deflected position after each of said intervals, said train including two yielding members, one adapted normally to retain said pointer in engagement with said element and to yield under the influence of said resilient means to permit said element to be returned to the stop when operative connection provided by said train is interrupted and while said pointer is retained in its deflected position, and the other to yield to a force transmitted through said train to permit said element to assume a position more remote from said stop than that corresponding to the retained position of the pointer, and both said members coacting to restore said pointer to the position of said element when said pointer is released, means operative during the retention of said pointer to establish impulses of durations dependent upon said deflected position with respect to said reference position, together with an instrument responsive to said impulses and having a movable member adapted to be positioned in response to successive impulses to provide a measure dependent upon their durations.

6. In combination: a rotating part whose rate of rotation is to be made the basis of a measurement, a demand mechanism of the class having a pointer and adapted to cause the same to excurse in each of a series of successive and uniform time intervals a distance corresponding to the average rate of rotation of said part in said interval, means for interrupting operative connection between said rotating part and said pointer after each of said uniform intervals, and means active immediately subsequently to each of said interruptions for retaining said pointer in its excursed position for a time dependent upon the magnitude of said excursion and for controlling an impulse of duration corresponding to said time, together with an instrument responsive to a succession of said impulses to provide a measure dependent upon their durations.

JAMES R. HICKS.
PERRY A. BORDEN.